(12) United States Patent
Shin

(10) Patent No.: US 11,610,374 B2
(45) Date of Patent: Mar. 21, 2023

(54) OPTICAL DEVICE FOR IMPLEMENTING AUGMENTED REALITY

(71) Applicant: LG ELECTRONICS INC., Seoul (KR)

(72) Inventor: Sungchul Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/283,120

(22) PCT Filed: Nov. 15, 2018

(86) PCT No.: PCT/KR2018/013978
§ 371 (c)(1),
(2) Date: Apr. 6, 2021

(87) PCT Pub. No.: WO2020/085564
PCT Pub. Date: Apr. 30, 2020

(65) Prior Publication Data
US 2021/0390783 A1    Dec. 16, 2021

(30) Foreign Application Priority Data
Oct. 23, 2018 (KR) .......................... 10-2018-0126572

(51) Int. Cl.
*G06T 19/00* (2011.01)
*G02B 5/32* (2006.01)
(Continued)

(52) U.S. Cl.
CPC .............. *G06T 19/006* (2013.01); *G02B 5/32* (2013.01); *G02B 27/017* (2013.01);
(Continued)

(58) Field of Classification Search
CPC ...... G06T 19/006; G02B 5/32; G02B 27/017; G02B 27/4205; G02B 27/0172;
(Continued)

(56) References Cited

U.S. PATENT DOCUMENTS 9,366,862 B2 *   6/2016   Haddick ................. G06F 3/011
10,180,572 B2 *  1/2019   Osterhout .............. G06Q 30/02
(Continued)

FOREIGN PATENT DOCUMENTS

| CN | 110168427 A | * | 8/2019 | ......... G02B 27/0075 |
| KR | 10-2004-0049146 A | | 6/2004 | |
| KR | 10-2016-0109021 A | | 9/2016 | |

OTHER PUBLICATIONS

Translation of ISR (Year: 2021).*

*Primary Examiner* — Tracie Y Green
(74) *Attorney, Agent, or Firm* — Birch, Stewart, Kolasch & Birch, LLP

(57) ABSTRACT

In order to provide an optical device for clearly implementing augmented reality provided from a display unit, regardless of a change in a focal point of an outer mirror through which a user views, the present invention comprises: the display unit for emitting an optical beam displaying an image; transparent glass through which external light passes and which forms the path of the optical beam emitted by the display unit; and a pinhole mirror disposed to the glass, and disposed on the path of the optical beam emitted by the display unit, so as to reflect the optical beam emitted by the display unit, wherein the pinhole mirror has a polygonal shape and has an area less than that of the pupil so that an image formed by the optical beam emitted by the display unit overlaps with an image formed by the external light having been transmitted through the glass.

11 Claims, 11 Drawing Sheets

(51) Int. Cl.
    *G02B 27/42*        (2006.01)
    *G06F 3/01*         (2006.01)
    *G02B 27/01*        (2006.01)

(52) U.S. Cl.
    CPC .......... *G02B 27/4205* (2013.01); *G06F 3/011*
            (2013.01); *G02B 27/0172* (2013.01); *G02B
                                    2027/0178* (2013.01)

(58) Field of Classification Search
    CPC ............ G02B 2027/0178; G02B 5/005; G02B
                                    27/0075; G06F 3/011
    See application file for complete search history.

(56)            References Cited

U.S. PATENT DOCUMENTS

| | | |
|---|---|---|
| 2002/0044287 A1 | 4/2002 | Otaki |
| 2015/0153551 A1 | 6/2015 | Kobori et al. |
| 2017/0038591 A1 | 2/2017 | Jepsen |

\* cited by examiner (a)

(b)

(c)

(d)

(a)

(b)

(a)

(b)

(a)

(b)

(a)

(b)

OPTICAL DEVICE FOR IMPLEMENTING AUGMENTED REALITY

CROSS REFERENCE TO RELATED APPLICATIONS

This application is the National Phase of PCT/KR2018/013978 filed on Nov. 15, 2018, which claims priority under 35 U.S.C. § 119(a) to Patent Application No. 10-2018-0126572 filed in Republic of Korea on Oct. 23, 2018, all of which are hereby expressly incorporated by reference into the present application.

TECHNICAL FIELD

The present disclosure relates to an optical device. More specifically, the present disclosure may be applied to realize an augmented reality in an outer scene viewed through an optical device.

BACKGROUND ART

In augmented reality (AR), a virtual object is superimposed on a real world that an user sees. AR is also referred to as mixed reality (MR) in which the real world is mixed with a virtual world with additional information in real time to obtain a single image. AR refers to a hybrid VR system in which real and virtual environments are mixed with each other. Research and development thereof has been underway in the US since the late 1990s.

In the augmented reality as a concept that complements the real world with a virtual world, the virtual environment obtained with computer graphics is used. However, in the AR, a main environment is the real environment. The computer graphics serve to provide additional information necessary for the real environment. In the AR, a 3D virtual image overlaps with a real image that the user is viewing such that distinction between the real environment and a virtual screen becomes ambiguous.

In virtual reality, the user is immersed in the virtual environment and may not see the real environment. However, the augmented reality in which the real environment and the virtual object are mixed with each other allows the user to see the real environment, thereby providing a better sense of reality and additional information. For example, when a smartphone camera captures surroundings, information such as locations and phone numbers of stores in the surroundings are displayed in a three-dimensional image.

Augmented reality is used for telemedicine diagnosis broadcasting, broadcasting, architectural design, and manufacturing process management. With the recent widespread use of smartphones, augmented reality has entered a stage of full-scale commercialization, and AR based various products are also being developed in the game, and mobile solution based education field.

Augmented reality as realized outdoors is referred to as a wearable computer. In particular, a computer screen device worn on a head enables augmented reality by superimposing computer graphic characters and the like on the real environment viewed by the user in real time.

However, in the wearable computer (display) which allows the user to see an outside scene in a see-through manner, it is difficult to match a focal length at which the user sees the outside scene and a focal length of the augmented reality provided from the wearable computer with each other.

SUMMARY

The present disclosure provides an optical device that clearly implements the augmented reality provided from the wearable computer (display) despite change in a focal point of an outer scene as viewed by the user.

The present disclosure provides an optical device that continuously realizes the augmented reality provided from the wearable computer (display) despite the user's pupil movement.

The present disclosure provides an optical device that clearly implements the augmented reality provided from the wearable computer (display) despite the user's pupil movement.

According to one aspect of the present disclosure in order to achieve the purposes, provided is an optical device comprising a display unit for irradiating a light beam to display an image; a glass made of a transparent material, wherein external light passes through the glass and the glass defines therein a path of a light beam irradiated from the display unit; and a pin-hole mirror disposed on or in the glass and positioned at a path of the light beam irradiated from the display unit to reflect the light beam irradiated from the display unit, wherein the pin-hole mirror has a polygonal shape and has an area smaller than an area of a pupil so that an image formed using the light beam irradiated from the display unit overlaps an image formed using the external light passing through the glass.

Further, according to one aspect of the present disclosure, the glass includes a first glass, a second glass, and an inclined face interposed therebetween, wherein the inclined face is inclined toward the pupil, wherein a plurality of pin-hole mirrors are arranged on the inclined face.

Further, according to one aspect of the present disclosure, the plurality of pin-hole mirrors are arranged along an arc and on the inclined face such that paths of the light beams irradiated from the display unit to the plurality of pin-hole mirrors are identical with each other.

Further, according to one aspect of the present disclosure, the first glass or the second glass further has a lens face located between the display unit and the pin-hole mirrors to allow paths of the light beams irradiated from the display unit to the plurality of pin-hole mirrors to be identical with each other.

Further, according to one aspect of the present disclosure, the inclined face is curved in a direction perpendicular to a direction in which the light beam from the display unit is irradiated.

Further, according to one aspect of the present disclosure, the glass further includes a lens on one face thereof into which the light beam irradiated from the display unit is introduced.

Further, according to one aspect of the present disclosure, each of the plurality of pin-hole mirrors acts as a pin-hole lens mirror to cancel a difference between the paths of the light beams irradiated from the display unit.

Further, according to one aspect of the present disclosure, the plurality of pin-hole mirrors are arranged in a lattice structure and on the inclined face.

Further, according to one aspect of the present disclosure, the lattice structure has a lattice spacing determined based on a distance from the pin-hole mirror to the pupil, a size of the pupil, and a wavelength of the light beam irradiated from the display unit.

Further, according to one aspect of the present disclosure, the lattice structure forms a periodic pattern having a reflection angle in a form of HOE (Holographic Optical Element) or DOE (Diffractive Optical Element).

Further, according to one aspect of the present disclosure, the pin-hole mirror has a long axis length having a positive square root of a product of a focal length and a wavelength of the light beam emitted from the display unit.

Further, according to one aspect of the present disclosure, the glass has a face through which the external light passes and which is planar or curved.

Further, according to one aspect of the present disclosure, the device comprises a spectacle frame coupled to the glass to maintain a constant spacing between the glass and the pupil.

Advantageous Effects

The effects of the optical device according to the present disclosure will be described as follows.

The optical device according to the present disclosure may clearly realize the augmented reality provided from the wearable computer (display) despite the change in the focal point of the outer scene as viewed by the user.

The optical device according to the present disclosure may continuously realize the augmented reality provided from the wearable computer (display) despite the user's pupil movement.

The optical device according to the present disclosure may clearly realize the augmented reality provided from the wearable computer (display) despite the user's pupil movement.

A further scope of applicability of the present disclosure will become apparent from the detailed descriptions below. However, various changes and modifications within the spirit and scope of the present disclosure may be clearly understood by those skilled in the art. Thus, it is to be understood that the detailed description and certain embodiments such as preferred embodiments of the present disclosure are given by way of example only.

DETAILED DESCRIPTION

Figure 1:
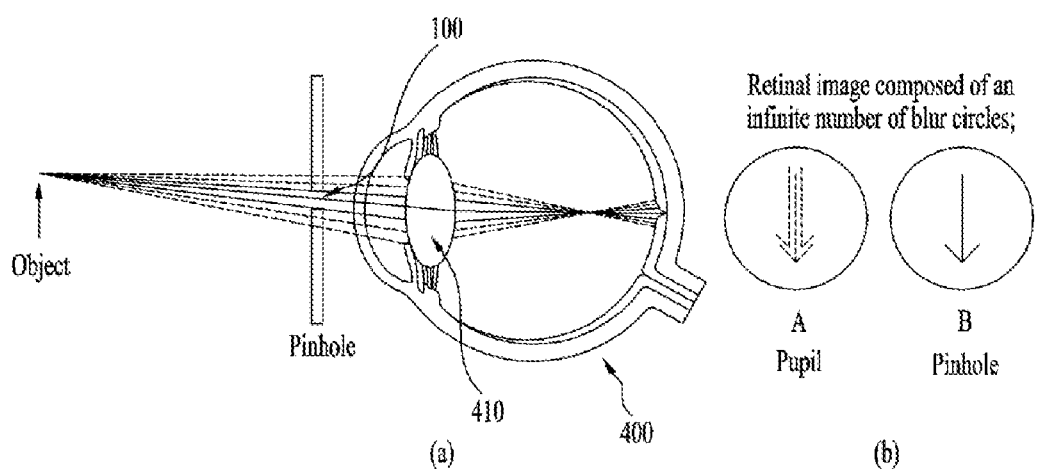
FIG. 1 is a diagram for illustrating a pin-hole effect.

Hereinafter, embodiments disclosed in the present specification will be described in detail with reference to the accompanying drawings. Identical or similar elements are denoted by the same reference numerals, and redundant descriptions thereof will be omitted.

Suffixes "module" and "unit" for constituent elements used in the following description are given or used interchangeably in consideration of only ease of preparation of the specification, and do not have meanings or roles that are distinguished from each other. Further, in describing the embodiments disclosed in the present specification, when it is determined that a detailed description of a related known component may obscure gist of the embodiments disclosed in the present specification, the detailed description thereof will be omitted. Further, the accompanying drawings are intended only for making it easier to understand the embodiments disclosed in the present specification, and the technical idea disclosed in the present specification is not limited by the accompanying drawings. It should be understood that all changes, equivalents or substitutes may fall within the spirit and scope of the present disclosure.

Terms including ordinal numbers such as first and second may be used to describe various elements, but the elements are not limited by the terms. The above terms are used only for the purpose of distinguishing one component from another component.

When a first component is referred to as being "connected" or "coupled" to a second component, it should be understood that the first component may be directly connected or coupled to the second component, but a third component may be present therebetween. To the contrary, when a first component is referred to as being "directly connected" or "directly coupled" to a second component, it should be understood that a third component is absent therebetween.

As used herein, the singular forms "a" and "an" are intended to include the plural forms as well, unless the context clearly indicates otherwise.

It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof.

The following embodiments of the present disclosure are intended to embody the present disclosure and do not limit the scope of the present disclosure. What may be easily inferred by the skilled person to the technical field to which the present disclosure belongs from the detailed description and the embodiments of the present disclosure is interpreted as belonging to the scope of the present disclosure.

FIG. 1 is a diagram for illustrating a pin-hole effect.

In the pin-hole effect, a pin-hole through which a user sees an object is a hole defined using a pin, and the user may see more clearly the object while light transmits through the pin-hole. This effect is due to the nature of light using refraction of light. As the light passes through the pin-hole, a depth of field (DOF) thereof becomes larger, and an image formed on a retina may become clear.

Specifically, referring to a principle of a pin-hole lens, (a) in FIG. 1 shows an effect that the light reflected from the object passes through a fine-sized pin-hole 100, and the depth of field (DOF) at which an image may be effectively formed is larger.

As the depth of field (DOF) at which the image is effectively formed is larger, and when the user sees the object through the pin-hole 100 (B), a clearer image may be formed on the retina than when the user sees the object with an naked eye (A). FIG. 1 also illustrates a lens 410 of the user's eye 400.

Hereinafter, an optical device according to the present disclosure that implements an augmented reality using the pin-hole effect will be described.

Figure 2:
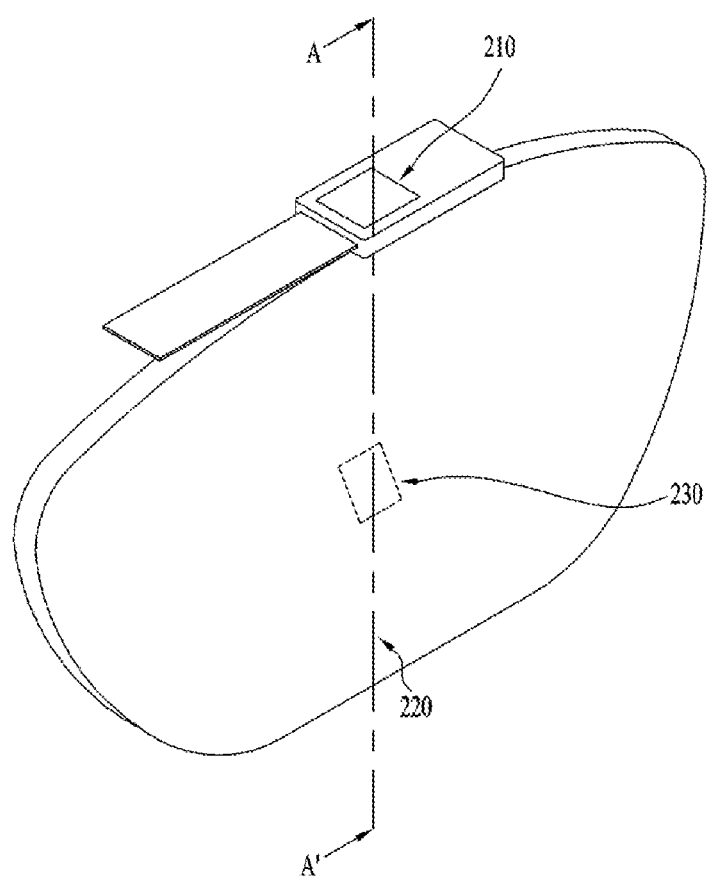
FIG. 2 is a perspective view of an optical device implementing augmented reality based on a pin-hole effect according to an embodiment of the present disclosure.
Figure 3:
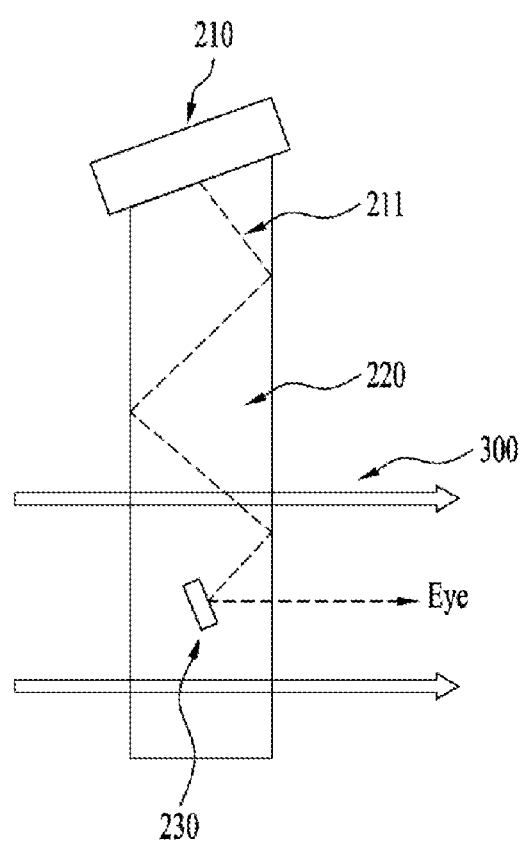
FIG. 3 is a cross-sectional view in a A-A' direction of FIG. 2.

FIG. 2 is a perspective view of an optical device implementing an augmented reality based on a pin-hole effect according to an embodiment of the present disclosure, and FIG. 3 is a cross-sectional view in a A-A' direction of FIG. 2.

An optical device according to the present disclosure may include a display unit 210 that irradiates a light beam to display an image, a glass 220 made of transparent material which and external light 300 passes through, and which defines a path 211 of the light beam irradiated by the display unit 210, and a pin-hole mirror 230 disposed in the glass 220 and disposed at the path 211 of the light beam radiated from the display unit 210 to reflect the light beam radiated from the display unit 210.

The pin-hole mirror 230 may be formed to have a smaller area than that of the pupil, and may provide a larger depth of field as in the pin-hole lens of FIG. 1.

As the pin-hole mirror 230 provides the larger depth of field, the user may see the augmented reality provided from the display unit 210 clearly and in a superimposed manner, even though a focal point at which the user sees the outside scene through the glass 220 is variable.

The display unit 210 may be disposed on one side face of the glass 220 such that the light beam irradiated from the display unit 210 may be guided to the pin-hole mirror 230 via total internal reflection.

The glass 220 may condense a light beam irradiated from the display unit 210 to define the path to allow the light beam to be guided to the pin-hole mirror 230.

The glass 220 may have one side face having the display unit 210 as an inclined face so that the image provided from the display unit 210 has a wide field of view (FOV). That is, one side face of the glass 220 on which the display unit 210 is disposed is embodied as an inclined face, so that a light beam provided from the display unit 210 may be introduced into the glass 220 in a wider manner.

The glass 220 may have a face through which the external light 300 transmits as a flat face or a face having a curvature.

The glass 220 may be embodied as at least one of a glass substrate, a plastic substrate, and a metal substrate.

The light beam irradiated from the display unit 210 may be a light beam generating a 2D image or a 3D image. The 3D image may include at least one of a stereo image or a multi-view image.

An embodiment in which the light beam irradiated from the display unit 210 is reflected from the pin-hole mirror 230 is not limited to FIG. 3.

Hereinafter, another embodiment in which the light beam irradiated by the display unit 210 is reflected from the pin-hole mirror 230 will be described.

Figure 4:
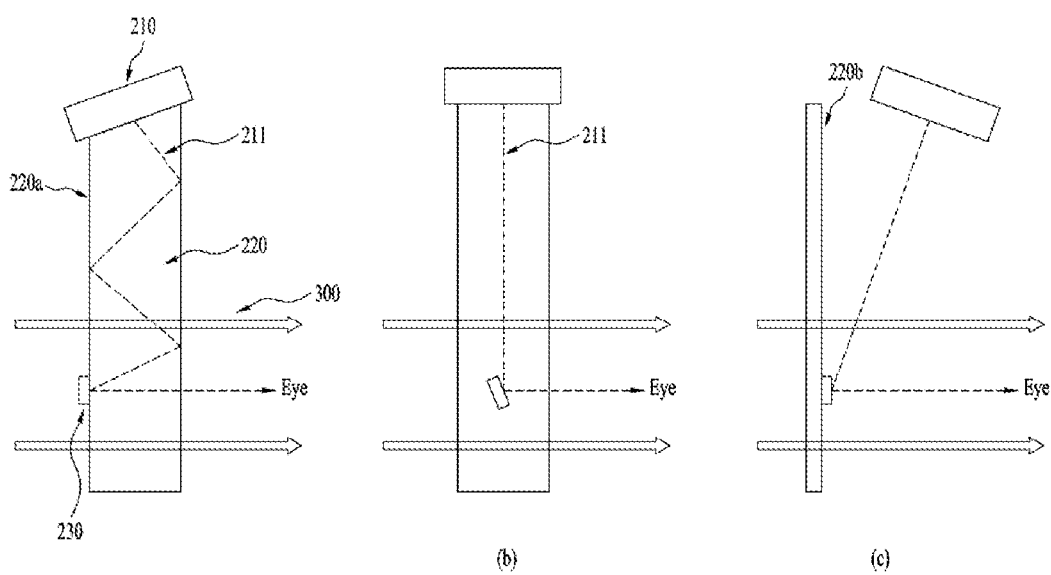
FIG. 4 is a cross-sectional view of an optical device according to another embodiment of the present disclosure viewed in the direction A-A' of FIG. 2.

FIG. 4 is a cross-sectional view of an optical device according to another implementation of the present disclosure as viewed in the A-A' direction of FIG. 2.

Specifically, (a) in FIG. 4 shows an embodiment in which the pin-hole mirror 230 is disposed on a face 220a of the glass 220 onto which the external light 300 is incident. According to the embodiment shown in (a) in FIG. 4, the pin-hole mirror 230 may be manufactured in a film type and may be attached to the glass 220. Thus, it may be easy to manufacture the pin-hole mirror 230. In this case, the pin-hole mirror 230 may have a prism characteristic capable of changing a path of a light beam according to a user's eye EYE.

Further, (b) in FIG. 4 shows an embodiment in which the light beam irradiated from the display unit 210 is not subject to total internal reflection of the glass 220 but is reflected directly from the pin-hole mirror 230 to reach the user's eye EYE. According to the embodiment shown in (b) in FIG. 4, it may be easy to manufacture the optical device in that the optical device may provide an augmented reality regardless of a shape of a face of the glass 230 through which the external light 300 passes.

Further, (c) in FIG. 4 shows an embodiment in which the light beam irradiated from the display unit 210 is reflected from the pin-hole mirror 230 disposed on the face 220b of the glass 220 from which the external light 300 is emitted out to reach the user's eye EYE. According to the embodiment shown in (c) in FIG. 4, the display unit 210 is adjacent to and is spaced apart from a rear face of the glass 220, so that the display unit 210 may irradiate the light beam toward the face 220b of the glass 220 from which the external light 300 is emitted out. For example, the display unit 210 may be disposed on an eye glasses frame (not shown) that is coupled to the glass 220 to maintain a constant distance between the glass 220 and the pupil. This embodiment may be easily applied to a case when a thickness of the glass 220 is not sufficient to accommodate the light beam emitted from the display unit 210. Further, the optical device of this embodiment is irrelevant to the shape of the face of the glass 220, and the pin-hole mirror 230 is manufactured in a film shape, and thus the device may be easily manufactured.

The pin-hole mirror 230 according to the present disclosure has a polygonal shape. A plurality of pin-hole mirrors 230 may be arranged in an array pattern, which will be described in detail below.

Figure 5:
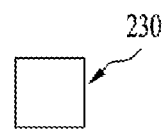
FIG. 5 is a diagram for illustrating a shape and an array pattern structure of pin-hole mirrors according to an embodiment of the present disclosure.
Figure 5:
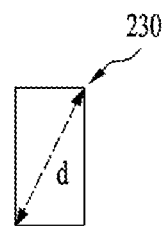
Figure 5:
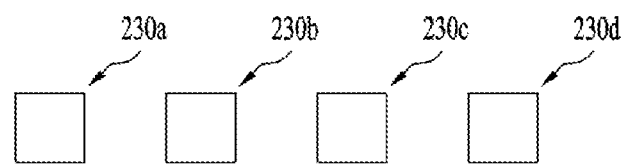
Figure 5:
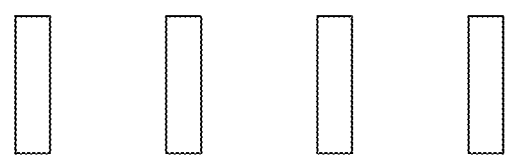
Figure 5:
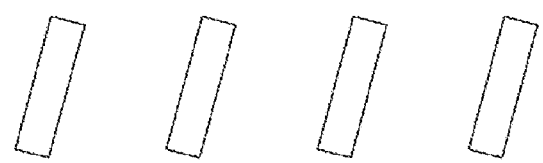

FIG. 5 is a diagram for illustrating a shape and an array pattern structure of pin-hole mirrors according to an embodiment of the present disclosure.

The pin-hole mirror 230 according to the present disclosure may be manufactured in a polygonal structure such as a square ((a) in FIG. 5) and a rectangular shape ((b) in FIG. 5).

In this case, a long axis length d of the pin-hole mirror 230 may have a positive square root of a product of a focal length f and a wavelength λ of the light beam irradiated from the display unit.

Further, the optical device according to the present disclosure may include a plurality of pin-hole mirrors 230a, 230b, 230c, and 230d. That is, in the optical device according to the present disclosure, the pin-hole mirror 230 may have a single polygonal mirror structure ((a) and (b) in FIG. 5), or a polygonal array pattern structure ((c) to (e) in FIG. 5).

In some cases, the pin-hole mirror 230 may have a line mirror structure or a lattice structure, which will be described in detail in FIG. 11.

Figure 6:
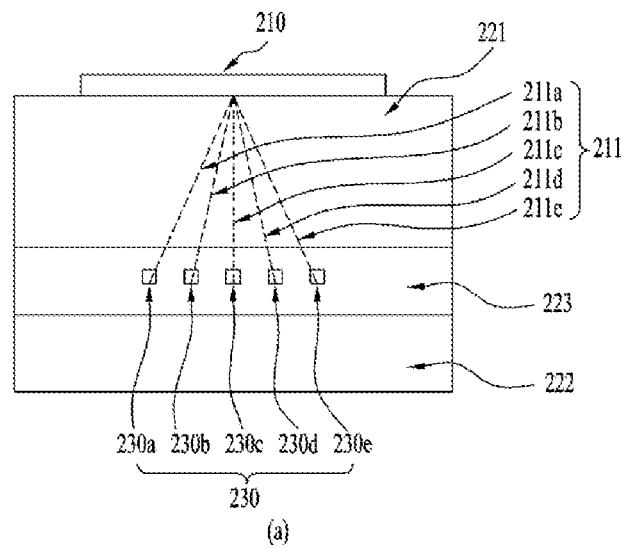
FIG. 6 is front and perspective views of an optical device including a plurality of pin-hole mirrors according to an embodiment of the present disclosure.
Figure 6:
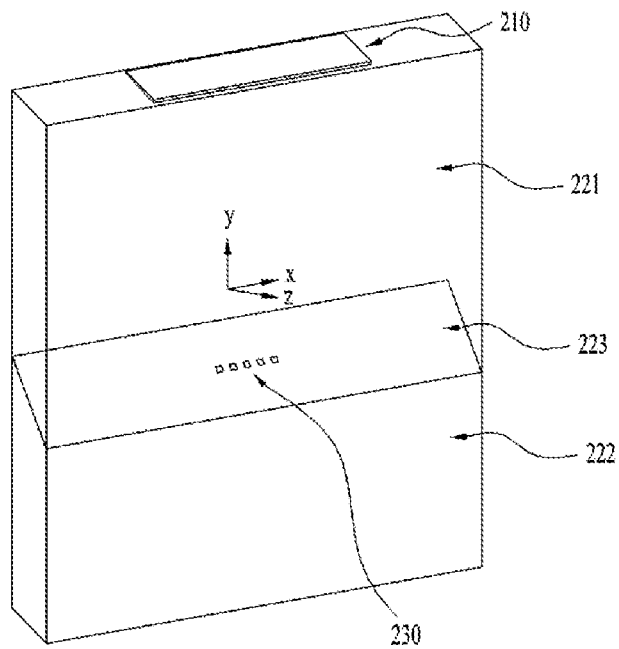

FIG. 6 is front and perspective views of an optical device including a plurality of pin-hole mirrors according to an embodiment of the present disclosure.

When the pin-hole mirrors 230 are disposed inside the glass 220, the glass 220 may include a combination of a first glass 221 and a second glass 222 such that the first glass 221 and the second glass 222 sandwich an inclined face 223 therebetween which is inclined toward the pupil. The plurality of pin-hole mirrors 230 may be arranged on the inclined face 223.

Specifically, the display unit 210 may be disposed on an opposite face of the first glass 221 to the inclined face 223. The display unit 210 may inject the light beam into the first glass 221 to irradiate the light beam 211 toward the plurality of pin-hole mirrors 230a to 230e.

In accordance with the present disclosure, the plurality of pin-hole mirrors 230a to 230e may be arranged in one direction, so that even though the user moves the pupil thereof, the augmented reality provided from the display unit 210 may be continuously implemented on the outside scene.

However, when the plurality of pin-hole mirrors 230a to 230e are arranged in one direction as shown in FIG. 6, a difference between paths 211a to 211e of the light beam radiated from the display unit 210 may occur. In this case, the augmented reality provided from the display unit 210 may form a double image due to the difference between the paths of the light beam. This problem is solved based on an embodiment of the present disclosure as described below.

Figure 7:
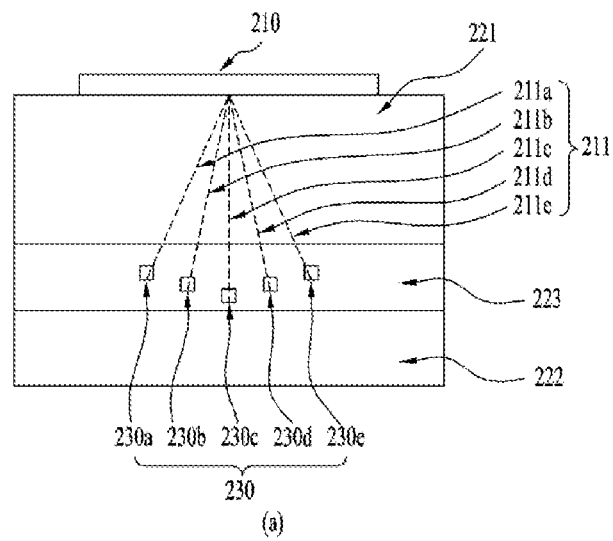
FIGS. 7 to 9 are front and perspective views of an optical device including a plurality of pin-hole mirrors according to another embodiment of the present disclosure.
Figure 7:
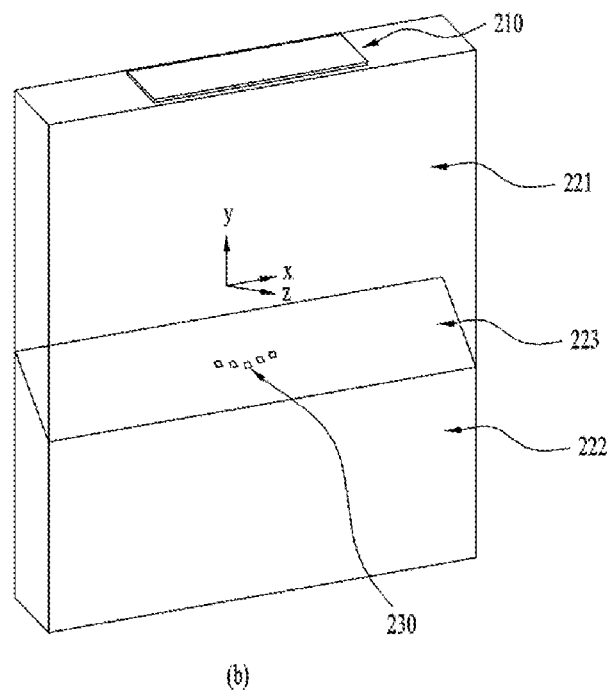
Figure 8:
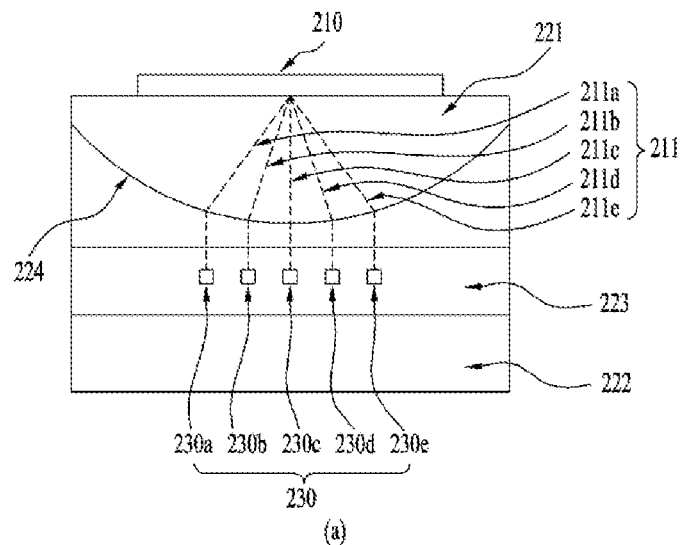
Figure 8:
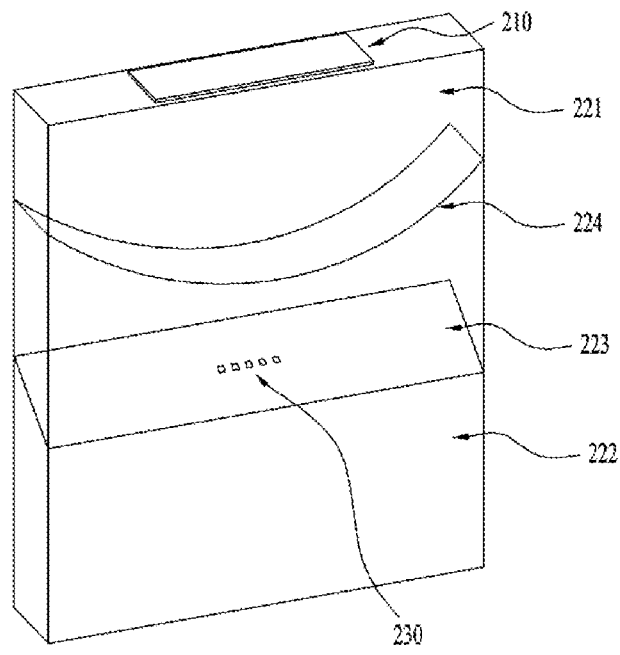
Figure 9:
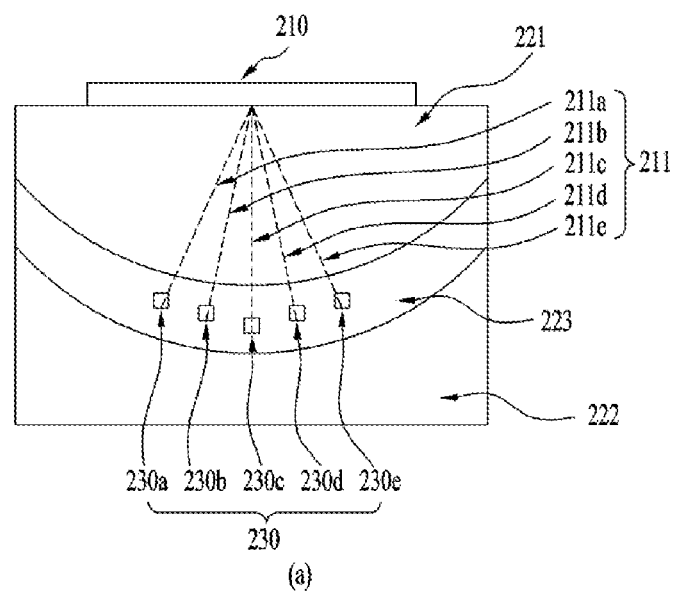
Figure 9:
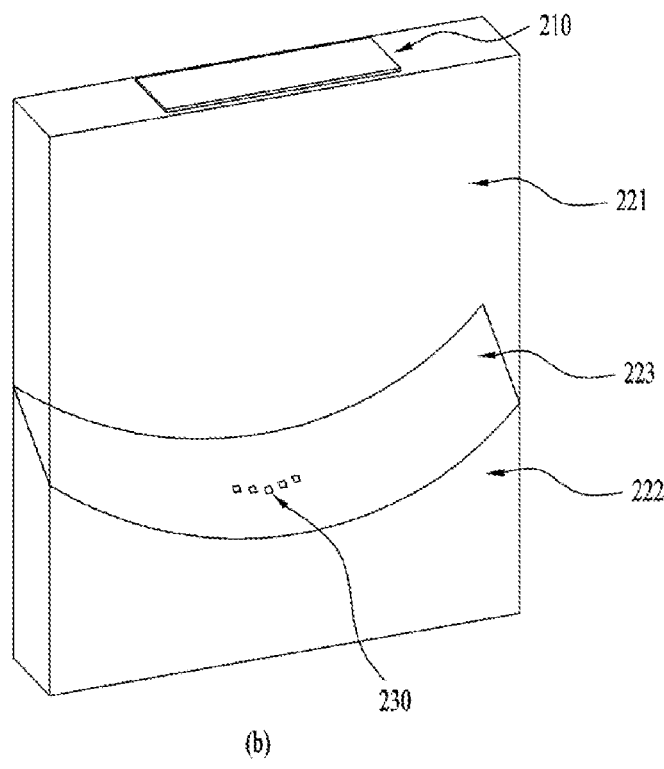

FIGS. 7 to 9 are front and perspective views of an optical device including a plurality of pin-hole mirrors according to another embodiment of the present disclosure.

Specifically, in FIG. 7, the plurality of pin-hole mirrors 230a to 230e are arranged along an arc and on the inclined face 223 such that the difference between the optical paths 211a to 211e of the light beam irradiated from the display unit 210 to the plurality of pin-hole mirrors 230a to 230e may be removed. The plurality of pin-hole mirrors 230a to 230e are arranged along the arc such that and pin-hole mirrors 230a and 230e positioned at both ends of the arc may be disposed on a higher level (along a y-axis direction) of the inclined face 223, and the pin-hole mirror 230c at a center of the arc may be disposed at the lowest level of the inclined face 223, so that the difference between the paths of the light beam radiated from the display unit 210 may be removed.

Further, FIG. 8 shows an embodiment in which a lens face 224 that cancels the difference between the paths of the light beam 211 irradiated toward the plurality of pin-hole mirrors 230a to 230e is formed in the first glass 221. The lens face 224 may be curved to cancel the difference between the paths 211a to 211e of the light beam irradiated toward the plurality of pin-hole mirrors 230a to 230e.

Further, FIG. 9 shows an embodiment in which the inclined face 223 is curved along a direction perpendicular to a direction in which the light beam is irradiated from the display unit 210. However, the curvature of the inclined face 223 may be adjusted according to the reflection direction from the pin-hole mirrors 230a to 230e.

Further, FIGS. 7 to 9 are individual embodiments for canceling the difference between the paths of the light beam irradiated from the display unit 210, respectively. In some cases, the difference between the paths of the light beam may be canceled by combining the embodiments of FIGS. 7 to 9 with each other.

Figure 10:
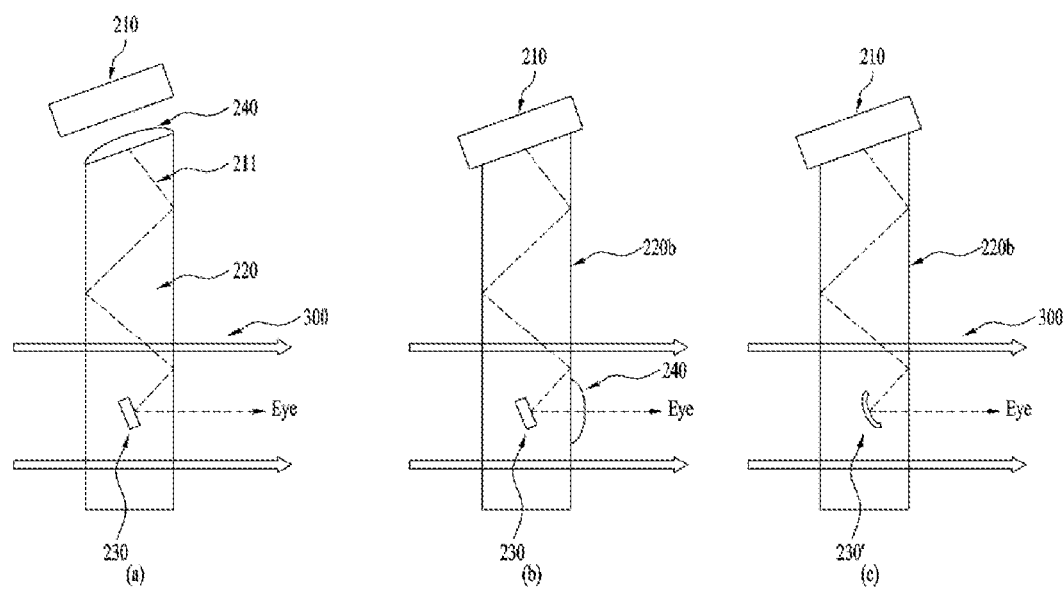
FIG. 10 is a cross-sectional view of an optical device according to another implementation of the present disclosure as viewed in the A-A' direction of FIG. 2.

FIG. 10 is a cross-sectional view of an optical device according to another implementation of the present disclosure as viewed in the A-A' direction of FIG. 2.

The optical device according to the present disclosure may further include a lens 240 at a path 211 of the light beam irradiated from the display unit 210.

Using the lens 240, a wide field of view (FOV) may be secured in the display unit 210 according to the present disclosure, and a distortion phenomenon may be corrected by canceling a difference between paths of the plurality of pin-hole mirrors 230.

Specifically, the lens 240 may be disposed on a face of the glass 220 into which the light beam from the display unit 210 is input ((a) in FIG. 10). Therefore, the light beam irradiated from the display unit 210 may flow into the glass 220 through the lens 240, may be reflected from the pin-hole mirror 230, and then may be incident into the eye of the user.

Further, the lens 240 may be disposed on the face 220b of the glass 220 from which the external light 300 is emitted out ((b) in FIG. 10) Therefore, the light beam irradiated from the display unit 210 may be reflected from the pin-hole mirror 230 and input into the user's eye EYE through the lens 240.

In some cases, each of the plurality of pin-hole mirrors 230 may act as a pin-hole lens mirror 230' that cancels a difference between the paths of the light beam emitted from the display unit 210 ((c) FIG. 10). That is, each of the plurality of pin-hole mirrors 230 may act as a pin-hole lens mirror 230' having own lens characteristics.

In the above descriptions, the embodiment in which the plurality of pin-hole mirrors 230 are arranged in a single line or curve is illustrated. However, in some cases, the plurality of pin-holes 230 may be arranged in a lattice structure, which will be described in detail based on FIG. 11 below.

Figure 11:
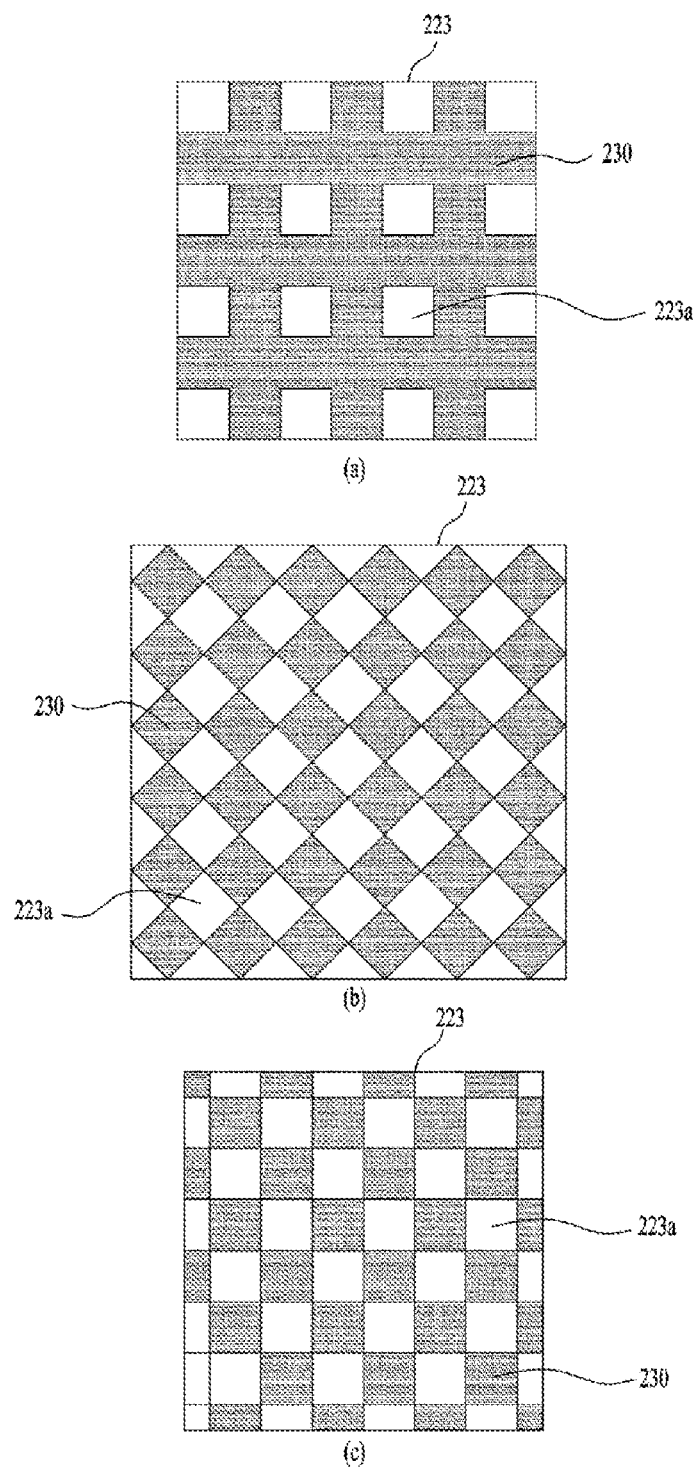
FIG. 11 is a diagram for illustrating a shape and an array pattern structure of pin-hole mirrors according to another implementation of the present disclosure.

FIG. 11 is a diagram for illustrating a shape and an array pattern structure of pin-hole mirrors according to another implementation of the present disclosure.

Specifically, FIG. 11 is a view for illustrating a shape and an array pattern structure of the pin-hole mirrors 230 arranged on the inclined face 223 as described in FIG. 6.

The plurality of pin-hole mirrors 230 may be connected to or spaced apart from each other and may be arranged in a certain pattern to form a lattice structure.

The plurality of pin-hole mirrors 230 may be formed of a coating film having a lattice structure and attached to the inclined face 223.

The plurality of pin-hole mirrors 230 having the lattice structure may be arranged in a periodic pattern having a reflection angle in a form of a HOE (Holographic Optical element) or a DOE (Diffractive Optical element).

In the lattice structure, a lattice spacing may be determined based on a distance from the pin-hole mirror 230 to the pupil, a pupil size, and a wavelength A of the light beam irradiated from the display unit.

Specifically, the lattice structure may be at least one of a mesh structure ((a) in FIG. 11), a diamond pattern structure ((b) in FIG. 11), or a stripe pattern structure ((c) in FIG. 11).

The above detailed description should not be construed as restrictive in all respects and should be considered as illustrative. The scope of the present disclosure should be determined by reasonable interpretation of the appended claims, and all changes within the equivalent scope of the present disclosure are included in the scope of the present disclosure.

What is claimed is:

1. An optical device comprising:
   a display unit for irradiating a light beam to display an image;
   a glass made of a transparent material, wherein external light passes through the glass and the glass defines therein a path of a light beam irradiated from the display unit,
   wherein the glass includes a first glass, a second glass, and an inclined face interposed therebetween, and
   wherein the inclined face is inclined toward a pupil; and a plurality of pin-hole mirrors disposed on or in the glass and positioned at a path of the light beam irradiated from the display unit to reflect the light beam irradiated from the display unit, wherein the plurality of pin-hole mirrors have a polygonal shape and have an area smaller than an area of the pupil so that an image formed using the light beam irradiated from the display unit overlaps an image formed using the external light passing through the glass, and wherein the plurality of pin-hole mirrors are arranged in a lattice structure and on the inclined face.

2. The device of claim 1, wherein the plurality of pin-hole mirrors are arranged along an arc and on the inclined face such that paths of the light beams irradiated from the display unit to the plurality of pin-hole mirrors are identical with each other.

3. The device of claim 1, wherein the first glass or the second glass further has a lens face located between the display unit and the pin-hole mirrors to allow paths of the light beams irradiated from the display unit to the plurality of pin-hole mirrors to be identical with each other.

4. The device of claim 1, wherein the inclined face is curved in a direction perpendicular to a direction in which the light beam from the display unit is irradiated.

5. The device of claim 1, wherein the glass further includes a lens on one face thereof into which the light beam irradiated from the display unit is introduced.

6. The device of claim 1, wherein each of the plurality of pin-hole mirrors acts as a pinhole lens mirror to cancel a difference between the paths of the light beams irradiated from the display unit.

7. The device of claim 1, wherein the lattice structure has a lattice spacing determined based on a distance from the pin-hole mirror to the pupil, a size of the pupil, and a wavelength of the light beam irradiated from the display unit.

8. The device of claim 7, wherein the lattice structure forms a periodic pattern having a reflection angle in a form of HOE (Holographic Optical Element) or DOE (Diffractive Optical Element).

9. The device of claim 1, wherein the pin-hole mirror has a long axis length having a positive square root of a product of a focal length and a wavelength of the light beam emitted from the display unit.

10. The device of claim 1, wherein the glass has a face through which the external light passes and which is planar or curved.

11. The device of claim 1, wherein the device comprises a spectacle frame coupled to the glass to maintain a constant spacing between the glass and the pupil.

* * * * *